US011287638B2

(12) United States Patent
DeAngelis

(10) Patent No.: US 11,287,638 B2
(45) Date of Patent: Mar. 29, 2022

(54) REFLEX SIGHT WITH SUPERLUMINESCENT MICRO-DISPLAY, DYNAMIC RETICLE, AND METADATA OVERLAY

(71) Applicant: Francesco E. DeAngelis, Herndon, VA (US)

(72) Inventor: Francesco E. DeAngelis, Herndon, VA (US)

(73) Assignee: Francesco E. DeAngelis, Herndon, VA (US)

( * ) Notice: Subject to any disclaimer, the term of this patent is extended or adjusted under 35 U.S.C. 154(b) by 0 days.

(21) Appl. No.: 16/997,567

(22) Filed: Aug. 19, 2020

(65) Prior Publication Data

US 2021/0055536 A1    Feb. 25, 2021

Related U.S. Application Data

(60) Provisional application No. 62/889,172, filed on Aug. 20, 2019.

(51) Int. Cl.
| | |
|---|---|
| *G02B 23/10* | (2006.01) |
| *F41G 1/30* | (2006.01) |
| *F41G 1/34* | (2006.01) |

(52) U.S. Cl.
CPC ............. *G02B 23/105* (2013.01); *F41G 1/30* (2013.01); *F41G 1/345* (2013.01)

(58) Field of Classification Search
CPC .......... G02B 23/105; F41G 1/30; F41G 1/345
(Continued)

(56) References Cited

U.S. PATENT DOCUMENTS

| | | | |
|---|---|---|---|
| 4,346,995 | A | 8/1982 | Morris |
| 4,695,161 | A | 9/1987 | Reed |

(Continued)

FOREIGN PATENT DOCUMENTS

| | | |
|---|---|---|
| DE | 69727718 | 10/2004 |
| EP | 2221571 | 8/2010 |

(Continued)

OTHER PUBLICATIONS

Kerif Night Vision (http://www.nitevis.com/EOTech_512-XBOW.htm.

(Continued)

*Primary Examiner* — Samir Abdosh
(74) *Attorney, Agent, or Firm* — KED & Associates LLP

(57) ABSTRACT

A reflex site having a superluminescent micro-display, dynamic reticle, and metadata overlay is provided. The reflex site may include a housing; an optical collimator lens with a dichroic coating configured to reflect one or more wavelengths of light, wherein a target is viewable by a user through the optical collimator lens; a superluminescent micro-display that projects onto the optical collimator lens a reticle image for a desired point of impact of a bullet on a target and a related metadata overlay, wherein the reticle image and the related metadata overlay are superimposed on a view of the target viewable through the optical collimator lens, such that the target, the reticle image, and the related metadata overlay are all directly visible to the user, when viewing the target through the optical collimator lens; a microprocessor that calculates a ballistic solution for the target and generates the reticle image for the desired point of impact of the bullet on the target based on the calculated ballistic solution, the microprocessor providing a signal containing the reticle image and the related metadata overlay to the superluminescent micro-display; a power system that
(Continued)

provides power to the superluminescent micro-display and the microprocessor; a rail grabber configured to couple the reflex sight to a barrel of a weapon; and a boresighting mechanism configured to align the reflex sight with the barrel.

21 Claims, 8 Drawing Sheets

(58) Field of Classification Search
USPC .......................................................... 42/120
See application file for complete search history.

(56) References Cited

U.S. PATENT DOCUMENTS

| | | |
|---|---|---|
| 5,189,555 A | 2/1993 | Jörlöv |
| 5,434,704 A | 7/1995 | Connors et al. |
| 6,490,060 B1 | 12/2002 | Tai et al. |
| 6,601,966 B1 | 8/2003 | Wiklund et al. |
| 7,225,578 B2 | 6/2007 | Tai |
| 8,087,196 B2 | 1/2012 | Jung |
| 8,186,093 B1 | 5/2012 | Chung |
| 8,336,776 B2 | 12/2012 | Horvath et al. |
| 8,587,659 B1 | 1/2013 | Socolinsky et al. |
| 8,393,109 B2 | 3/2013 | Gilmore |
| 9,057,584 B2 | 6/2015 | Chung |
| 9,151,574 B2 | 10/2015 | Lowrey, III |
| 9,389,425 B2 | 7/2016 | Edwards et al. |
| 10,042,243 B1 | 8/2018 | Metayer |
| 10,184,758 B2 | 1/2019 | Lyren |
| 2005/0057808 A1* | 3/2005 | Houde-Walter ........ F41G 3/065 359/566 |
| 2005/0268521 A1 | 12/2005 | Cox et al. |
| 2008/0022575 A1 | 1/2008 | Drexler et al. |
| 2008/0066363 A1 | 3/2008 | Grauslys et al. |
| 2011/0315767 A1 | 12/2011 | Lowrance |
| 2012/0097741 A1 | 4/2012 | Karcher |
| 2012/0186132 A1 | 7/2012 | Matthews et al. |
| 2013/0333266 A1* | 12/2013 | Gose ...................... G01J 1/0466 42/111 |
| 2015/0054964 A1 | 2/2015 | Patton et al. |
| 2016/0084617 A1 | 3/2016 | Lyren |
| 2017/0211910 A1* | 7/2017 | Olmsted ................... F41G 1/30 |
| 2018/0224244 A1 | 8/2018 | Havens et al. |
| 2019/0154400 A1 | 5/2019 | Lyren |
| 2019/0353455 A1* | 11/2019 | McHale ................... H04N 5/33 |
| 2021/0055536 A1* | 2/2021 | DeAngelis .............. F41G 1/473 |

FOREIGN PATENT DOCUMENTS

| | | |
|---|---|---|
| JP | H-05256595 | 5/1993 |
| WO | WO 2015/075036 | 4/2015 |

OTHER PUBLICATIONS

Greengrass (http://greentreeinh2o.blogspot.com/2011/09/).
VIPER Sight—ITL (https://defense-update.com/20051102_viper-sight.html).
Zeus, Thermal Imaging Weapon Sight (https://images-na-ssl-images-amazon.com/images/I/BlkPgDBFi2S.pdf) pp. 11 and 18.
Trijicon ACOG 6×48 Scope, Red Chevron .50 BMG with TA75, M1913 Rail & RM02-33 Review (https://wesleyqq.wordpress.com/2012/09/07/trijicon-acog-6×48-scope-red-chevron-50-bmg-with-ta75-m1913-rail-rm02-33-review/).
Protect What You Love: Sight-In on Home Defense (https://sightmark.com/blog/index.php/tag/red-dot-sight/).

* cited by examiner

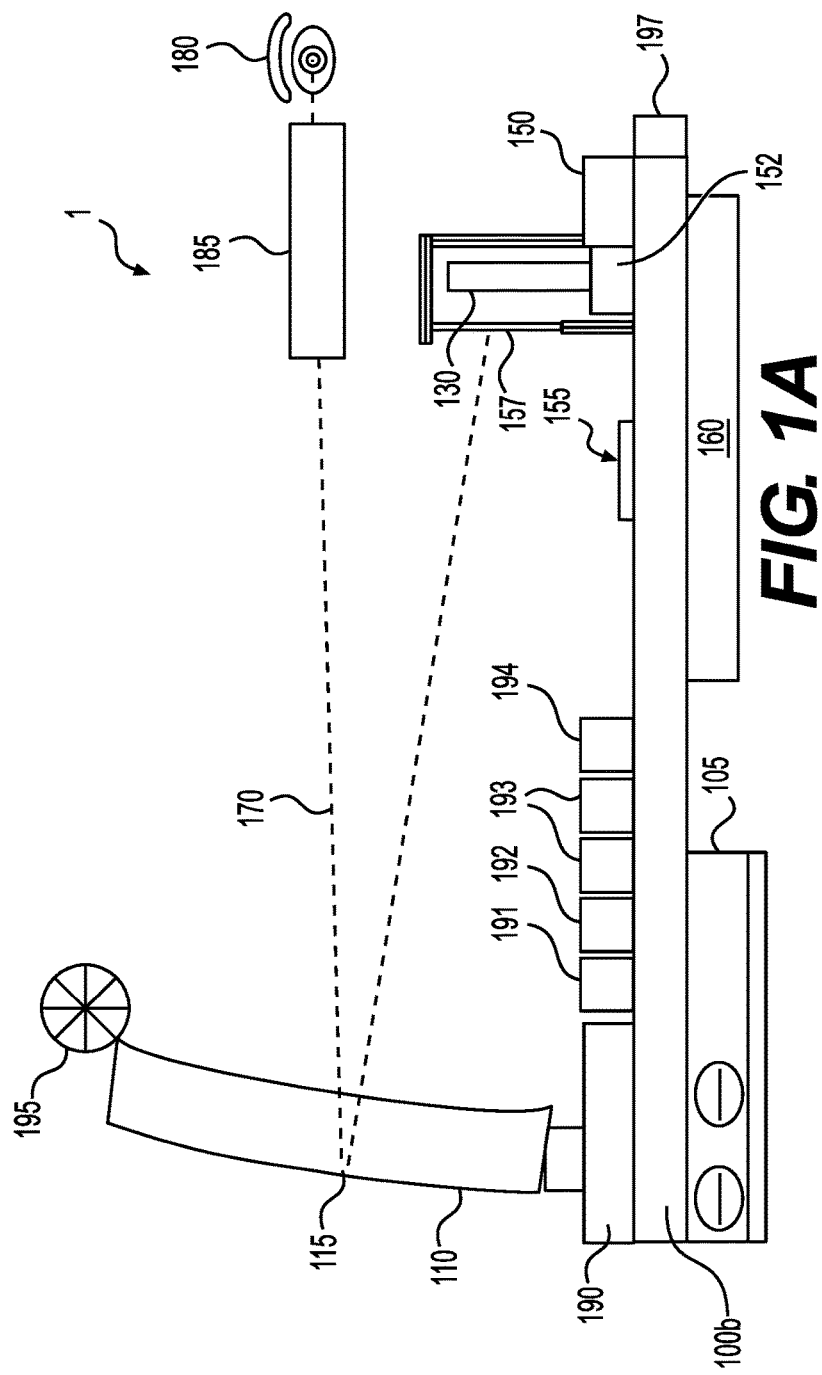
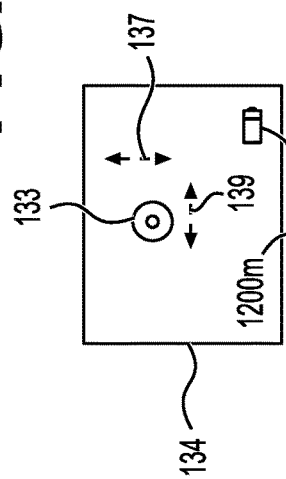
FIG. 1A
FIG. 1B

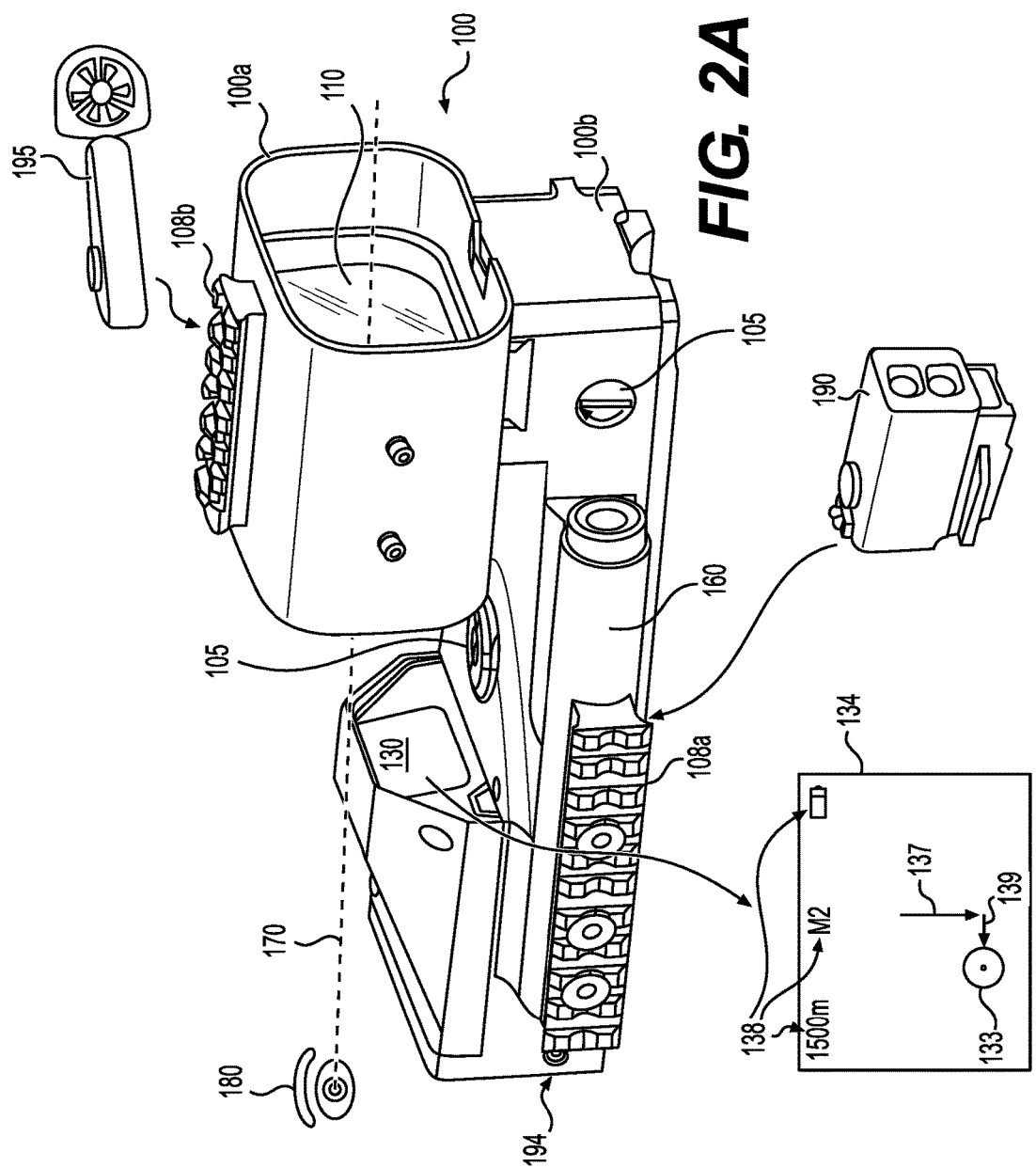

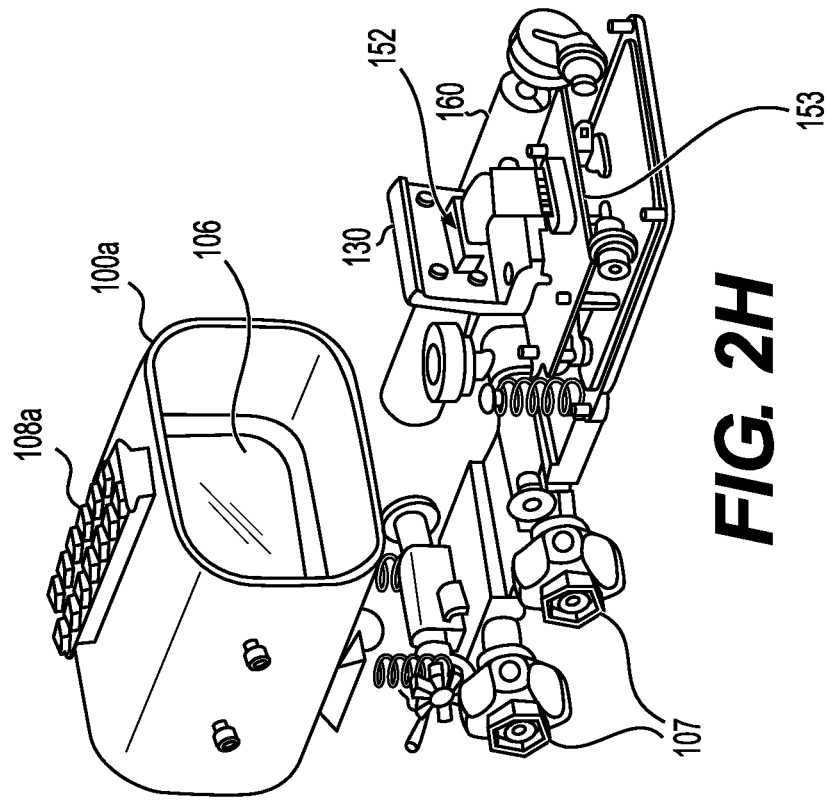
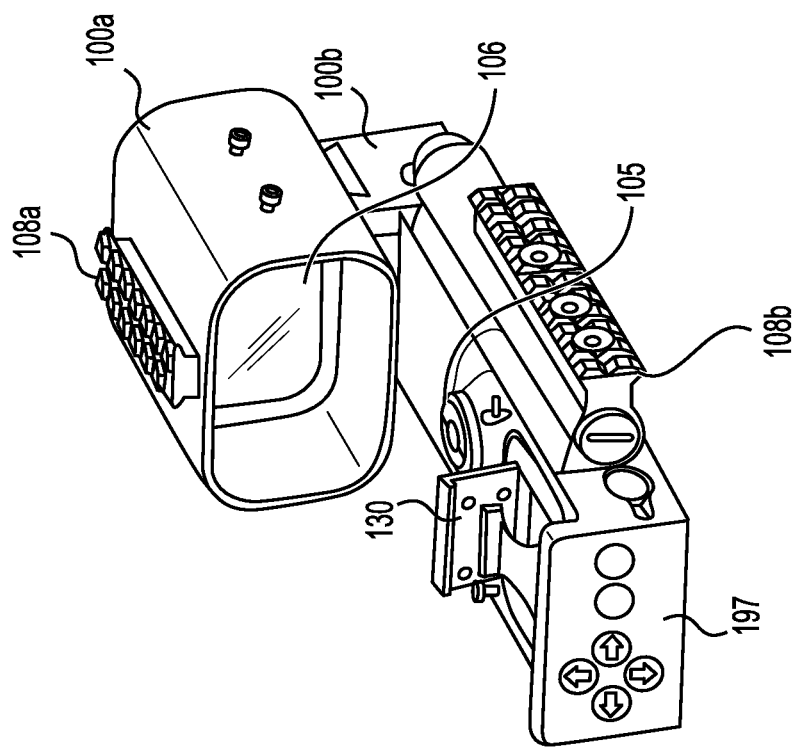

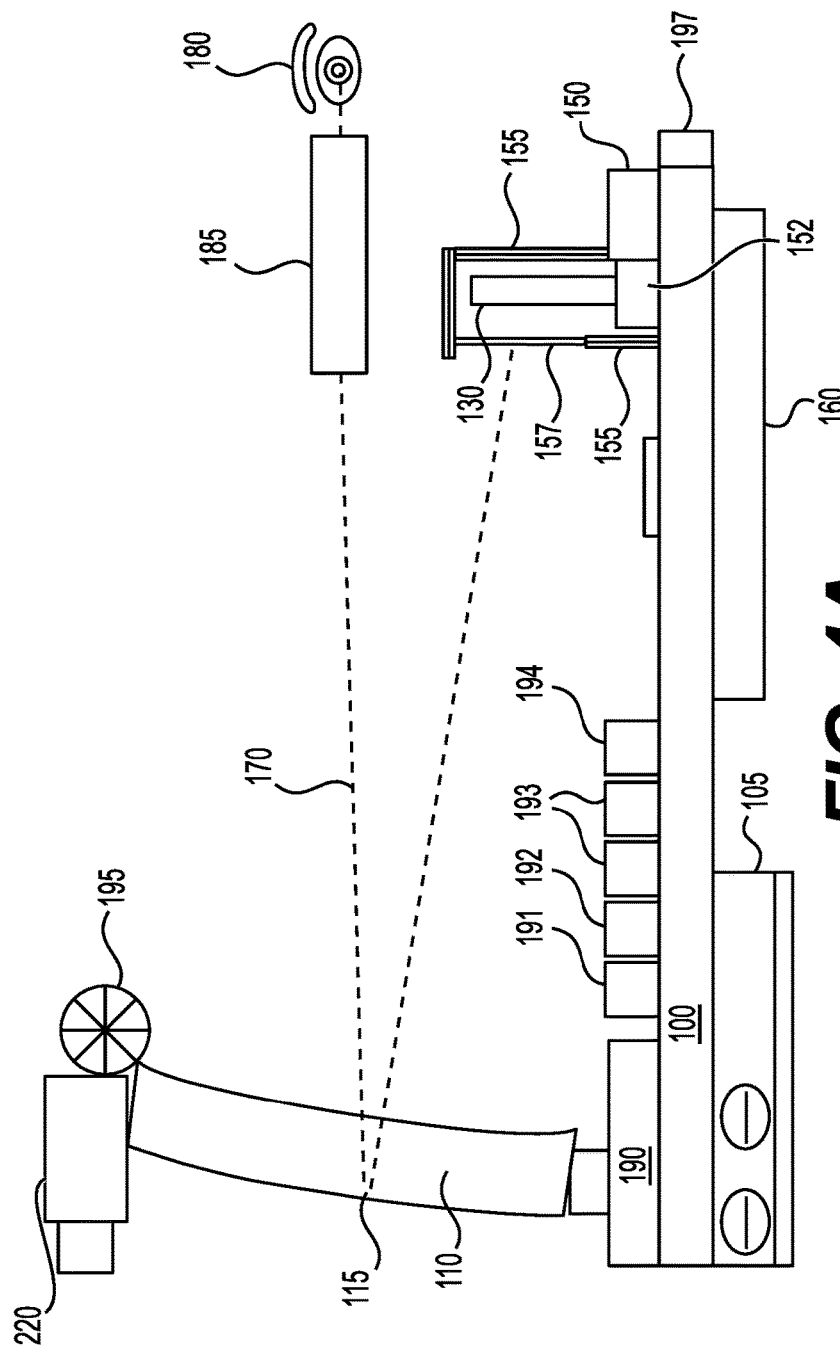
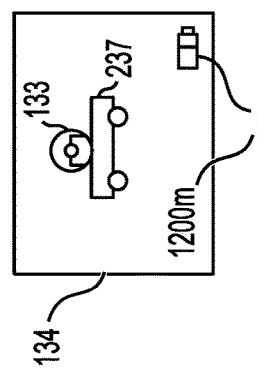
FIG. 4A
FIG. 4B

REFLEX SIGHT WITH SUPERLUMINESCENT MICRO-DISPLAY, DYNAMIC RETICLE, AND METADATA OVERLAY

CROSS-REFERENCE TO RELATED APPLICATION(S)

This application claims priority to U.S. Provisional Application No. 62/889,172 filed on Aug. 20, 2019, whose entire disclosure is hereby incorporated by reference.

BACKGROUND

1. Field

A reflex sight with superluminescent micro-display, dynamic reticle, and metadata overlay is disclosed herein.

2. Background

Current reflex or red dot sights provide a static illuminated dot or reticle pattern (reticle) at a center of a sight lens that is aligned with a target prior to shooting. These sights are quite accurate for a given target range as they tend to minimize parallax error by projecting the reticle out to infinity. This allows tactical shooters or machine gun shooters to very quickly aim and shoot with a relatively high degree of accuracy within a restricted range of target distances and conditions.

Typically, a static reticle location may be mechanically and manually adjusted vertically and horizontally to calibrate or zero a reticle to a location of bullet impact at a given target range. Once this is done, satisfactory accuracy may be achieved for any targets at that range. If the range varies significantly from the calibrated (zero) range, the reticle no longer accurately accounts for the bullet impact location. This is mainly due to bullet drop over distance traveled along with wind speed and other environmental effects. Also, this does not account for platform or target motion.

Some reflex sights and rifle scopes have included reticle markings, such as lines, circles, hash marks, or other reticle marks, that correspond to aiming points for additional target ranges and account for bullet drop. The shooter must know what range and/or wind corresponds to each reticle mark and how to improvise for target ranges that do not correspond to the reticle markings. Additionally, a user is left on his own to determine actual target range, wind, or other environmental effects. In tactical or machine gun shooting there is little time to figure all this out. As the range of potential targets, ammunitions, and environmental conditions, for example, increases, static reticle patterns can become overly complicated and difficult to use as they attempt to provide all the combined markings to capture a very large number of permutations of target ranges, target sizes, wind behaviors, and ammunition types, for example.

Related art pistol and rifle reflex sights are disclosed in U.S. Pat. Nos. 4,346,995, 5,189,555, and 6,490,060, for example, which are hereby incorporated by reference and employ static "red dot" reticles that are effectively parallax free and are used for ammo and ranges that have relatively straight line trajectories. U.S. Pat. No. 9,057,584, which is hereby incorporated by reference, has a static reticle with stadia marks that show bullet drop offsets for selected ranges while U.S. Pat. No. 8,087,196, which is hereby incorporated by reference, has a mechanical adjustment for moving a whole optical axis as a function of range. In all these static reticle sights, a shooter must calculate the range and select appropriate marks, and approximate in between those range marks when a desired range does not fall right on top of one of the range marks. This can be challenging even for an experienced shooter and results in increased error in between marks. Also, windage is not accounted for as it varies with range and gets too complicated to depict on a static reticle.

European Patent No. 2221571, which is hereby incorporated by reference, describes a dynamic red dot sight with moving mirror to position a dot image on an objective lens. This provides a dynamic reticle but is complex to manufacture and calibrate and not economically practical.

Reflex sights for larger high elevation trajectory shells, such as grenades and artillery shells, do have some dynamic reticles based on range. German Patent No. 69727718, which is hereby incorporated by reference, has a display external to the sight, while reflex sights or red dot sights with a displaceable target point, such as described in U.S. Pat. No. 7,225,578, which is hereby incorporated by reference, are known. These sights have a high rise (tall) design with a mirror or beam splitter or both, which have to be installed and maintain very high accuracy to shift the target to a ballistic aim point correctly. This makes these devices technically complex and challenging to manufacture.

A dynamic high-elevation sight is disclosed in International Patent No. WO 2015/075036, which is hereby incorporated by reference, and uses a micro-display, but is a virtual sighting device in which a target is marked in a crosshair and then the weapon is lifted until inclinometers and magnetic sensors indicate that the elevation correction is satisfactory. The target is no longer visible in the field of view at this point (virtual sight), and the display shows the calculated target mark aligned with the static crosshair as confirmation that the weapon is pointing in the right direction for ballistic impact on the target. This whole aiming activity must occur quickly as the shooter no longer sees the target and cannot track its movements. The device also requires use of a neutral density filter that covers the field of view of the main lens and is rotated to reduce brightness of the target image scene so the reticle is not washed out. This takes time and can be challenging in changing light conditions, not to mention that a darkening effect makes the target more difficult to see.

BRIEF DESCRIPTION OF THE DRAWINGS

Embodiments will be described with reference to the following drawings in which like reference numerals refer to like elements, and wherein:

FIG. 1A is a schematic view of a reflex sight according to an embodiment;

FIG. 1B is a view of a superluminescent micro-display with dynamic reticle and metadata overlay according to an embodiment;

FIG. 2A is a side perspective view of a reflex sight according to an embodiment;

FIG. 2B is a view of a superluminescent micro-display with dynamic reticle and metadata overlay according to an embodiment;

FIG. 2G is another perspective view of the reflex sight of FIG. 2A;

FIG. 2H is another perspective view of the reflex sight of FIG. 2A;

FIG. 4A is a schematic view of a reflex sight according to another embodiment;

FIG. 4B is a view of a superluminescent micro-display with dynamic reticle and metadata overlay according to an embodiment;

DETAILED DESCRIPTION

Figure 2E:
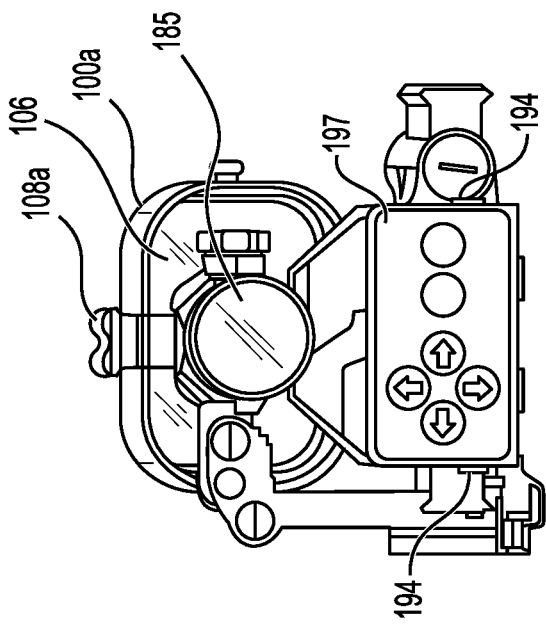
FIG. 2E is a rear view of the reflex sight of FIG. 2A including an optical magnifier.

Embodiments disclosed herein propose a reflex sight with a superluminescent micro-display, dynamic reticle, and metadata overlay. The reflex sight according to embodiments disclosed herein is a direct view sight, which means that a target is viewable through a viewing lens of the reflex sight, along with the dynamic reticle and metadata overlay. The reflex sight according to embodiments is intelligent in that it can instantaneously evaluate all user and sensor inputs and display a proper reticle pattern (reticle) and position to provide for rapid, accurate, and straightforward engagement of a target. Currently there are sensors, such as range finders, anemometers, compasses and/or global positioning sensors (GPS), temperature and humidity sensors, accelerometers/gyros, tilt and cant sensors, and other devices available to provide all data necessary to calculate a bullet trajectory and aim point for a given target and set of conditions. User entered parameters, such as ammunition data and reticle styles and colors, may be utilized to determine a pattern and color of the dynamically displayed reticle. The reflex sight according to embodiments may utilize these capabilities to automatically adjust reticle pattern, color, and position to a proper aim point for any given target and/or environmental conditions along with displaying dynamic metadata, such as range to target, selected ammunition, wind speed and direction, and battery status, for example.

Embodiments disclosed herein provide ease of use and simple manufacturing qualities of static reflex sights and long-range performance of high trajectory systems with dynamic ballistically calculated reticle positions and in field of view metadata display. Embodiments disclosed herein may be employed for high speed bullets and relatively straight line trajectories and include a superluminescent micro-display, for example, a brightness adjustable (0-20000+cd/m2) superluminescent active matrix light emitting diode (SAMLED) array for direct reticle observation on any bright or dark background, paired with a reflex style collimator lens with 0 optical power and a dichroic reflective coating, a microcontroller that processes ballistic and environmental calculations and provides reticle patterns and metadata to the micro-display, a boresighting mechanism that moves the collimator lens and micro-display in unison, a battery/power compartment, and an attachment mechanism for attaching to weapon rails. Optionally, a magnifier, rangefinder, and/or environmental sensors may be provided. A target and compensated reticle may both be in the field of view simultaneously.

The reflex sight with superluminescent micro-display, dynamic reticle, and meta data overlay according to an embodiment may include an optical system, a housing, a microprocessor-driven micro-display, a power system, a user interface, and a zeroing system for calibration. The micro-display may provide a reticle image whose design and position on the display is determined by calculations from the microprocessor. The microprocessor may receive inputs, such as a user selected reticle pattern, user selected reticle color, target range, ammunition parameters, environmental parameters, geolocation parameters, and/or target/platform movement parameters, for example. The reticle image pattern, and color may be dictated by user inputs, while a ballistically compensated reticle position on the micro-display may be dictated by a ballistic solution based on the target, ammunition, platform, and environmental inputs, for example. The optical system may project the ballistically compensated reticle image over a target image in a viewing lens.

Figure 2F:
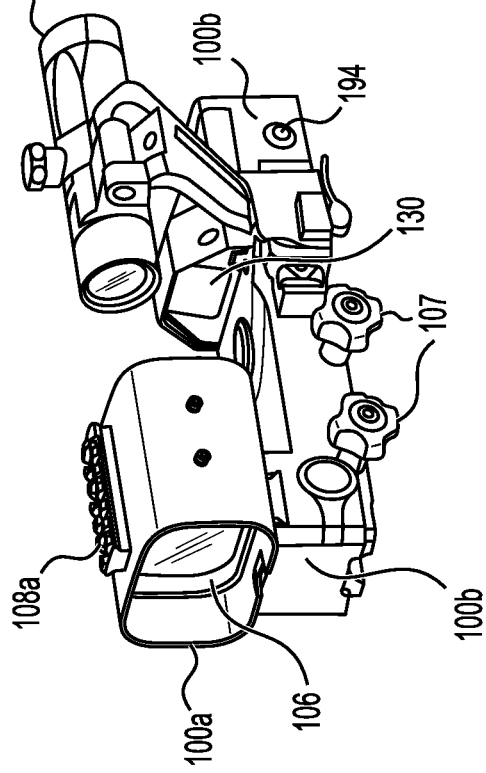
FIG. 2F is a rear perspective view of the reflex sight of FIG. 2E.
Figure 2C:
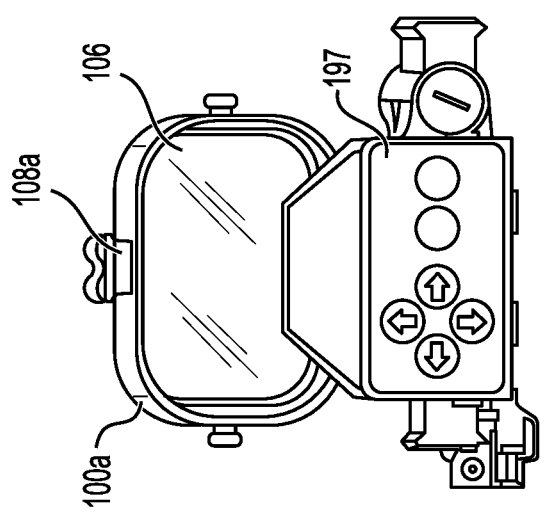
FIG. 2C is a rear view of the reflex sight of FIG. 2A.
Figure 2D:
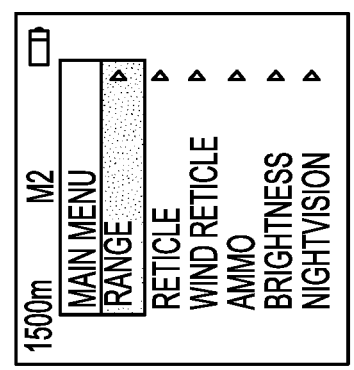
FIG. 2D is a view of a user interface of the reflex sight of FIG. 2A.

FIG. 1A is a schematic diagram of a reflex sight according to an embodiment. FIG. 1B is a view of a superluminescent micro-display with dynamic reticle and metadata overlay according to an embodiment. FIG. 2A is a side perspective view of a reflex sight according to an embodiment. FIG. 2B is a view of a superluminescent micro-display with dynamic reticle and metadata overlay according to an embodiment. FIG. 2C is a rear view of the reflex sight of FIG. 2A. FIG. 2D is a view of a user interface of the reflex sight of FIG. 2A. FIG. 2E is a rear view of the reflex sight of FIG. 2A including an optical magnifier. FIG. 2F is a rear perspective view of the reflex sight of FIG. 2E. FIG. 2G is another perspective view of the reflex sight of FIG. 2A, FIG. 2H is another perspective view of the reflex sight of FIG. 2A.

The reflex sight 1 according to embodiments may include a housing 100, in and/or on which various components of the reflex sight 1 may be housed and/or supported. The housing 100 may provide structural support for various reflex sight components and may be an open block or a tube. For example, the housing 100 may include a window frame 100a, and a support plate or frame 100b. A rail grabber 107 may be provided to attach the reflex sight 1 to a weapon. The rail grabber 107 may be, for example, a Picatinny rail grabber.

The reflex sight 1 may include a viewing lens or window 106, a curved mirror (collimator) lens 110, and a micro-display 130, which together form an optical system. The reflex sight 1 may also include an optical magnifier 185. A user (shooter) 180 may view an aiming point 115 along an optical path 170. The terms "user" and "shooter" are used interchangeably hereinafter.

The micro-display 130 may be, for example, a superluminescent micro-display. The micro-display 130 may include an illuminated pixel matrix 134 (see FIG. 1B) in which any given one or more pixels may be illuminated to form a reticle pixel pattern (reticle) 133 and information (metadata) overlay 138, such as range-to-target and battery status. The micro-display 130 may project the illuminated pixel matrix onto the curved mirror lens 110 to be received by a user along the optical axis 170. For example, the micro-display 130 may be a brightness adjustable (0-20000+ cd/m2) superluminescent active matrix light emitting diode (SAMLED) array for direct reticle observation on any bright or dark background.

The superluminescent micro-display utilizes the technology of superluminescent light emitting diodes (SLEDs). SLEDs combine the advantages of laser diodes (LDs), i.e., high power and brightness, and light emitting diodes (LEDs), i.e., low coherence, low power, and low cost, allowing for higher resolution and brightness, with low cost and low to no speckle noise. The superluminescent micro-display 130 provides higher resolution and adjustable brightness. This provides for greater angle correction within the directly observable field of view and direct reticle observation on any bright or dark background, eliminating the need for a neutral density filter or goggles, in comparison to other types of micro-displays.

The reticle pixel pattern 133 may be dynamically updated so that the reticle pixel pattern 133 moves in a vertical direction 137 and/or a horizontal direction 139 based on ballistic calculations, discussed hereinafter. The reticle pixel pattern 133 and metadata overlay 138 on the micro-display 130 may be illuminated by a display driver 152 and the reticle pixel pattern 133 may be positioned to point at a precise aiming point location 115 on the curved mirrored lens 110.

The curved mirrored (collimator) lens 110 may be a simple or complex concave lens, doublet, or triplet. The lens 110 may include a partially reflective (dichroic) coating on one or two or three of its surfaces.

The display driver 152 may be controlled by a computing device 150, which may be, for example, a micro-controller or micro-processor. The computing device 150 may receive input from, for example, a laser range finder 190, an inclinometer 191a, an accelerometer/gyro 191, a compass and/or global positioning sensor (GPS) 192, environmental sensors 193a-c, an external input port 194 (connected to an external anemometer and/or other sensors), an anemometer 195, and/or a user interface 197 (see FIG. 3). The computing device 150 may use information from one or more of these inputs to calculate a ballistic trajectory for a given target location and determine a precise aim point location 115 on the lens 110. The computing device 150 may then control the display driver 152 to position the reticle pixel pattern 133 on the micro-display 130 such that a reticle image appears precisely at the aiming point location 115 as seen by the user 180 looking down the optical path 170 toward the lens 110.

Thus, the micro-display 130 may provide a reticle pattern for an accurate point of impact based on internal ballistic calculations calculated by the computing device 150 which take into account a range to a target and/or environmental parameters and/or location and pointing direction, and/or bullet information, where each of these items may be provided by internal stored tables and/or user input and/or integrated sensor inputs, and/or external sensor inputs. The computing device 150 may collect range information from a range finding device, such as laser range finder 190, which may be integrated and embedded in the reflex sight 1, or which may be external to the reflex sight 1. The computing device 150 may collect environmental information from one or more sensors, such as environmental sensors 193a-c, which may be integrated and embedded in the reflex sight 1, or which may be external to the reflex sight 1. Further, the computing device 150 may collect platform movement data when the user 180 is on a platform and is moving relative to the target. The ballistic solution may include a flight trajectory for the bullet for the desired point of impact on the target based on at least one of a type of weapon, a type of bullet, windage, velocity, energy, lead, or flight time and compensating for atmospheric conditions. The atmospheric conditions may include at least one of temperature, barometric pressure, humidity, or altitude.

The optional magnifier 185 may be used to magnify the image of far-away targets. A power system 160, which may include one or more batteries, may provide power to the computing device 150 and the micro-display 130. A glass window 157 may be provided to protect the micro-display 130 and the lens 110.

The aiming point location 115 may be marked by the reticle pixel pattern, which may be moved both vertically and horizontally on the lens 110 to provide an optimal aiming point. To initially calibrate or zero the reflex sight 1 when first mounted on a weapon, a mechanical bore-sighting mechanism 105 may be used to move the housing 100 up and down or sideways relative to a weapon platform and/or the user interface 197 may be used to manually move the reticle image on the SLED until it corresponds to a desired impact point. Embodiments may include a software zeroing system so that the reflex sight 1 may be calibrated to a known target distance by moving the displayed reticle position in the SLED. The sight may be put into "Boresight Mode" via a menu selection by the user. A bullet is fired at the target and the user may move the reticle from a target center to an impact point of the bullet and select "Set Zero". When the reticle is then trained on the target center subsequently by the user, impact error is accounted for and the bullet will strike closer to the target center on the next shot. It may require several shots and zeroing cycles to reach a given error threshold, for example, 1 Minute of Angle (MOA). Alternatively, a combined mechanical and software zeroing system may be provided so that the reflex sight 1 may be calibrated to a known target distance in part by mechanical movement of the reflex sight 1 or a portion of the reflex sight 1 and in part by a software controlled movement of the displayed reticle position in the optical system.

FIG. 2A shows a side perspective view of the reflex sight. A user 180 views a target along optical axis 170 through the curved mirror lens 110, held in window frame 100a, and viewing lens 106. The micro-display 130 may be supported on the support plate 100b, along with any sensors, which may be provided on a printed circuit board (PCB) 153, for example. Laser range finder 190 may be coupled to rail 108a by, for example, a rail grabber. Anemometer 195 may be coupled to rail 108b by, for example, a rail grabber. Power system 160, such as a battery pack, may be provided on the support plate 100b, along with external input port 194.

FIG. 2C shows a rear view of the reflex sight of FIG. 2A. The user interface 197 may be provided as shown in FIG. 2C, and may include an input touch screen, by which a user 180 may input information to the computing device 150. The user interface 197 may include input buttons (see FIG. 2C) and/or menus (see FIG. 2D) selectable by the user 180 to input information, for example. Moreover, the user interface 197 may contain one or more components, such as a touch panel, one or more buttons, one or more knobs, one or more joysticks, and/or software menus, for example, in a display (display screen) or touch panel.

The optical magnifier 185 may be rotatably coupled to the support plate 100b. Thus, the optical magnifier 185 may be rotated into position for use. Embodiments disclosed herein may provide one or more user selectable magnification levels in the optical system.

Additional features, such as additional rail grabbers for mounting onto a weapon, additional rails for mounting accessories, protective lenses and lens caps, anti-reflection lenses and/or coatings, anti-glint devices, and other features which provide safety and ease of use to a user may be provided.

FIG. 2H shows control components of the reflex sight 1. The micro-display 130 and the display driver 152, along with various sensors, may be mounted on and/or incorporated into PCB 153.

Figure 3:
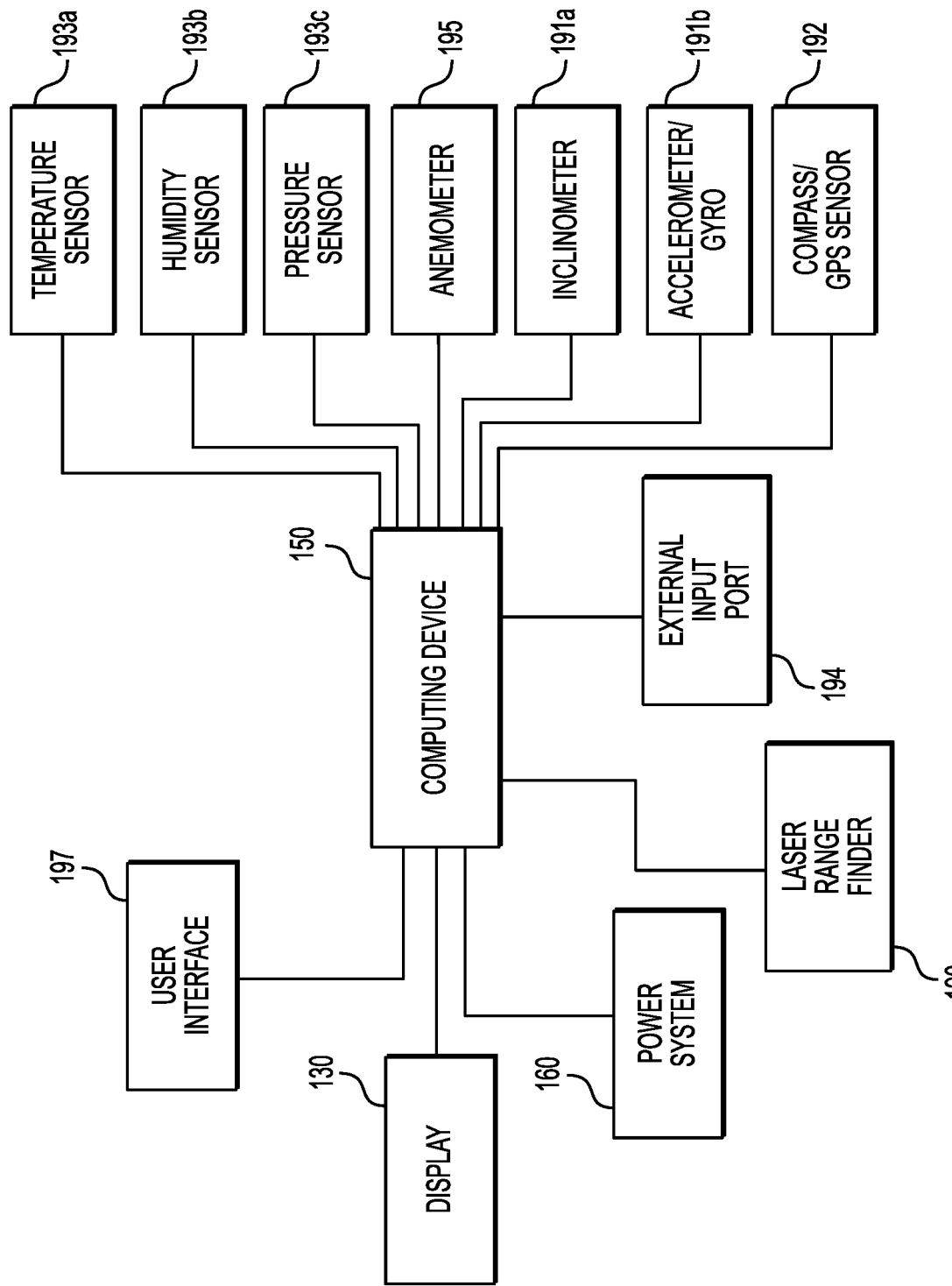
FIG. 3 is a block diagram of a reflex sight according to an embodiment.

FIG. 3 is a block diagram of a reflex sight according to an embodiment. FIG. 3 shows various components in communication with computing device 150. That is, as discussed above, the computing device 150, powered by power system 160, may receive input of information from the laser range finder 190, the inclinometer 191a, the accelerometer/gyro 191, the compass and/or GPS 192, the environmental sensors 193 (193a-c), the external input port 194, the anemometer 195, and/or the user interface 197. The environmental sensors 193a-c may include temperature sensor 193a, humidity sensor 193b, and/or pressure sensor 193c configured to sense temperature, humidity, and pressure, respectively, of the ambient environment. The computing device 150 may use the information received from these various components to calculate a ballistic solution for a particular weapon, ammunition, and target.

After calibration, the computing device 150 may use the information received from these various components to calculate a ballistic solution for a particular weapon, ammunition, and target. A user 180 may view a target through the curved mirror lens 110, onto which a dynamic reticle pattern and related metadata may be projected and overlayed on top of the target image. Thus, the user 180 may directly view a target, the dynamic reticle pattern 133, and related metadata 138 through the curved mirror lens 110, take aim and fire.

Figure 4C:
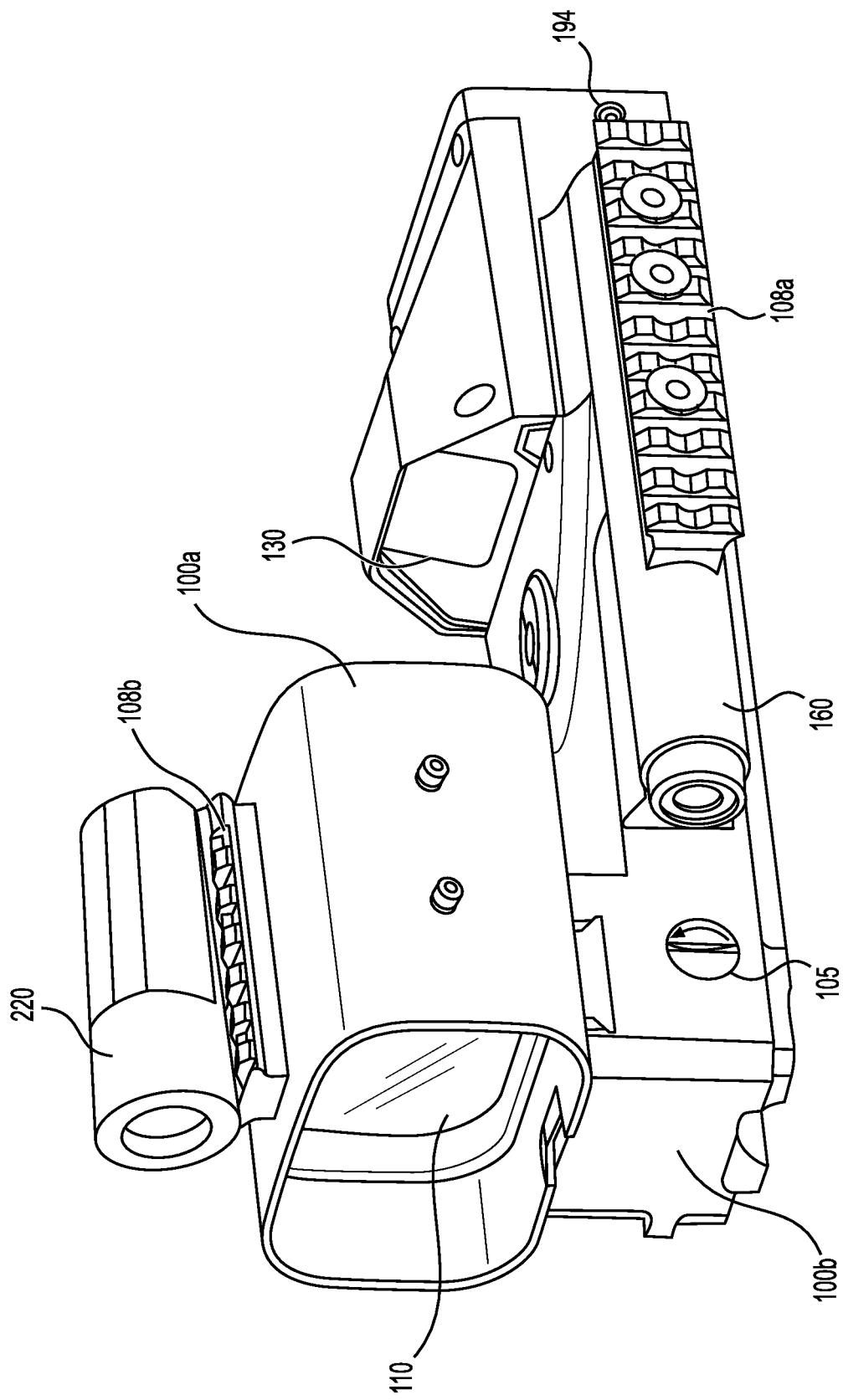
FIG. 4C is a side perspective view of a reflex sight according to another embodiment.
Figure 5:
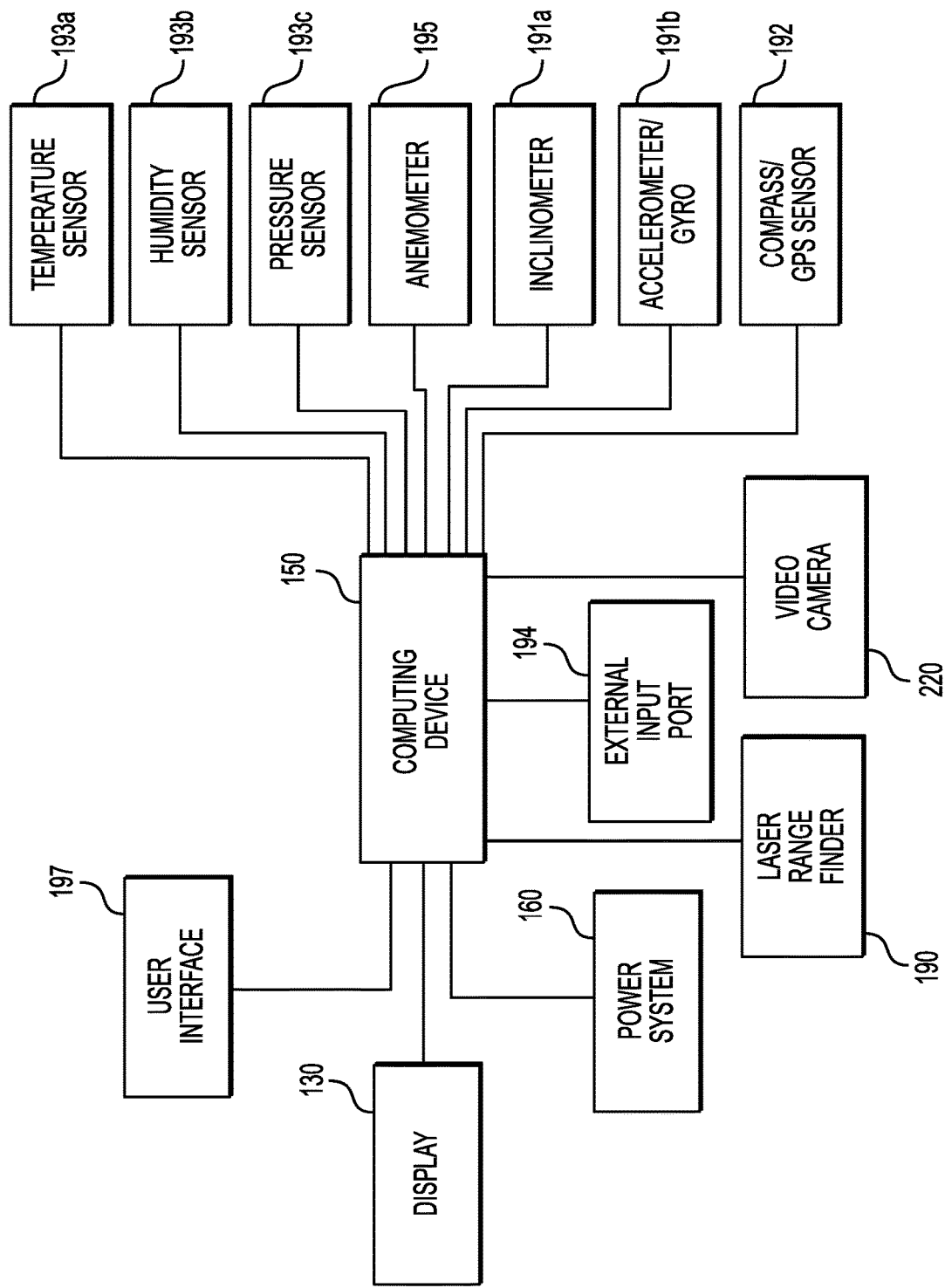
FIG. 5 is a block diagram of a reflex sight according to another embodiment.

FIG. 4A is a schematic view of a reflex sight according to another embodiment. FIG. 4B is a view of a superluminescent micro-display with dynamic reticle and metadata overlay according to an embodiment. FIG. 4C is a side perspective view of a reflex sight according to another embodiment. FIG. 5 is a block diagram of a reflex sight according to another embodiment. The embodiment of FIGS. 4A-5 is similar to the previous embodiment, bur further includes video camera 220. In the discussion hereinafter, like or similar reference numerals are used to indicate like or similar elements and repetitive discussion has been omitted.

With this embodiment, video camera 220 sends a video image 237 to computing device 150. The video camera 220 may be, for example, a digital video or thermal camera. The video image 237 is then combined with reticle pixel pattern (reticle) 133 and metadata overlay 138 to form a composite image on micro-display 130. This combined image is projected onto curved mirror lens 110 and is directly viewable by a user 180 along with a target. The video camera 220 may be, for example, a charge-coupled device (CCD) camera, a complementary metal-oxide semiconductor (CMOS) camera, a shortwave infrared (SWIR) camera, a long-wave infrared (LWIR) camera, or another type of camera, for example.

Embodiments disclosed herein provide a weapon sight that provides a micro-processor controlled micro-display reticle that adjusts its pattern and position dynamically to engage a target at a given range and set of environmental conditions. Embodiments disclosed herein position a reticle pattern for an accurate point of impact based on internal ballistic calculations which take into account a range to a target and/or environmental parameters and/or location and pointing direction, and/or bullet information and/or platform movement information where each of these items may be provided by internal stored tables and/or user input and/or integrated sensor inputs, and/or external sensor inputs.

Embodiments disclosed herein may collect range information from a range finding device, such as a laser range finder, which may be integrated and embedded in the device. Embodiments disclosed herein may collect range information from a range finding device, such as a laser range finder, which may be external to the device.

Embodiments disclosed herein may collect environmental information from one or more sensors which are integrated and embedded in the device. Embodiments disclosed herein may collect environmental information from one or more sensors which are external to the device.

Embodiments disclosed herein may collect platform movement or position data when the user is on a platform that is moving relative to the target.

Embodiments disclosed herein may include an integrated user interface containing one or more components, such as a touch panel, one or more buttons, one or more knobs, one or more joysticks, and/or software menus, for example, in a display (display screen). Embodiments disclosed herein may provide one or more user selectable magnification levels in the optical system. Embodiments disclosed herein may provide a user-friendly integrated package that provides stated capabilities.

Embodiments disclosed herein may provide a mechanical zeroing system so that the reflex sight may be calibrated to a known target distance by mechanically moving the device or a portion of the device. Embodiments disclosed herein may provide a software zeroing system so that the reflex sight may be calibrated to a known target distance by moving the displayed reticle position in the optical system.

Embodiments disclosed herein may provide a combined mechanical and software zeroing system so that the reflex sight may be calibrated to a known target distance in part by mechanical movement of the device or a portion of the device and in part by a software controlled movement of the displayed reticle position in the optical system.

Embodiments disclosed herein may provide internal ballistic tables for different types of ammunition so that a user may simply select ammunition type. Embodiments disclosed herein may provide user input menus in which the user may enter ammunition type and/or range to target and/or environmental parameters and/or other information which may be used in ballistic calculations or for display purposes. Embodiments disclosed herein may provide a user input that allows a reticle brightness to be manually controlled. Embodiments disclosed herein may provide an integrated light sensor with automatic reticle brightness control.

Embodiments disclosed herein may provide additional features, such as rail grabbers, for mounting onto a weapon, rails for mounting accessories, protective lenses and lens caps, anti-reflection lenses and/or coatings, anti-glint devices, and other features which provide safety and ease of use to a user.

Embodiments disclosed herein may provide a camera-based system as part of the optical system. A target image may be captured by an integrated camera.

Embodiments disclosed herein provide an enhanced performance reflex sight using a dynamic micro-display to provide enhanced real-time targeting and situational awareness information. The dynamic micro-processor controlled micro-display may dynamically draw and position a reticle based on user entered and sensor inputs and ballistic calculations. Embodiments disclosed herein utilize a micro-processor and a micro-display to develop a ballistic trajectory solution and aim point on sight optics, and then automatically display a reticle at a precise point with other pertinent dynamic information. The ballistic computer may be integrated with or coupled to a user interface and zero or more of a plurality of sensing devices in order to receive all the necessary data to draw and position the dynamic reticle.

A reflex sight according to embodiments disclosed herein may include a housing; an optical collimator lens disposed within the housing and including a dichroic coating configured to reflect one or more wavelengths of light, a target being viewable by a user through the optical collimator lens; a superluminescent micro-display that projects onto the optical collimator lens a reticle image for a desired point of impact of a bullet on a target and a related metadata overlay, wherein the reticle image and the related metadata overlay are superimposed on a view of the target viewable through the optical collimator lens, such that the target, the reticle image, and the related metadata overlay are all directly visible to the user, when viewing the target through the optical collimator lens; a microprocessor that calculates a ballistic solution for the target and generates the reticle image for the desired point of impact of the bullet on the target based on the calculated ballistic solution, the microprocessor providing a signal containing the reticle image and the related metadata overlay to the superluminescent micro-display; a power system that provides power to the superluminescent micro-display and the microprocessor; a rail grabber configured to couple the reflex sight to a barrel of a weapon; and a boresighting mechanism configured to align the reflex sight with the barrel. The reflex sight may further include a user interface configured to receive an input from a user. The user interface may include at least one of a touch panel, one or more buttons, one or more knobs, one or more joysticks, and/or software menus.

The microprocessor may move the reticle image vertically and laterally in response to input by a user via the user interface. Further, the microprocessor may control a brightness of the superluminescent micro-display in response to input by a user via the user interface.

The related metadata may include at least one of an ammunition type, a distance to the target, or a battery status. The power system may include at least one of a battery or a power cable connection.

The superluminescent micro-display may include a superluminescent active matrix light emitting diode (SAMLED) array. The reflex sight may include a laser range finder configured to provide to the microprocessor distance to target data.

The reflex sight may include a video camera. The superluminescent micro-display may project a video image onto the optical collimator lens as a video image overlay.

The reflex sight may include at least one of a temperature sensor, a humidity sensor, a pressure sensor, an anemometer, an inclinometer, an accelerometer/gyro, or a global positioning system (GPS) sensor, and the microprocessor receives data from the at least one of the temperature sensor, the humidity sensor, the pressure sensor, the anemometer, the inclinometer, the accelerometer/gyro, or the global positioning system (GPS) sensor. The microprocessor may calculate the ballistic solution for the target based on the data received from the at least one of the temperature sensor, the humidity sensor, the pressure sensor, the anemometer, the inclinometer, the accelerometer/gyro, or the global positioning system (GPS) sensor.

The boresighting mechanism may allow the reflex sight to be moved vertically and/or horizontally with respect to the barrel.

The microprocessor may include a memory configured to store data. The stored data may include ammunition tables and user settings.

The reflex sight may include a light sensor configured to sense ambient light. The microprocessor may control a brightness of the superluminescent micro-display in response to the sensed ambient light.

The reflex sight may further include a magnifier configured to magnify the target. The rail grabber may include a Picatinny rail grabber.

The ballistic solution may include a flight trajectory for the bullet for the desired point of impact on the target based on at least one of a type of weapon, a type of bullet, windage, velocity, energy, lead, or flight time and compensating for atmospheric conditions. The atmospheric conditions may include at least one of temperature, barometric pressure, humidity, or altitude.

A reflex sight according to embodiments may include a housing; an optical collimator lens disposed within the housing and including a dichroic coating configured to reflect one or more wavelengths of light, a target being viewable by a user through the optical collimator lens; a superluminescent micro-display that projects onto the optical collimator lens a reticle image for a desired point of impact of a bullet on a target and a related metadata overlay, wherein the reticle image and the related metadata overlay being super imposed on a view of the target viewable by a user through the optical collimator lens, such that the target, the reticle image, and the related metadata overlay being all directly visible to the user, when viewing the target through the optical collimator lens, and wherein the superluminescent micro-display is brightness adjustable to allow viewing of the target, the reticle image, and the related metadata overlay at all levels of ambient light; a microprocessor that calculates a ballistic solution for the target and generates the reticle image for the desired point of impact of the bullet on the target based on the calculated ballistic solution, the microprocessor providing a signal containing the reticle image and the related metadata overlay to the display; a power system that provides power to the display and the microprocessor; and a rail grabber configured to couple the reflex sight to a barrel of a weapon.

A reflex sight according to embodiments may include a housing; an optical collimator lens disposed within the housing and including a dichroic coating configured to reflect one or more wavelengths of light, a target being viewable by a user through the optical collimator lens; a video camera configured to a video image of the target; a superluminescent micro-display that projects onto the optical collimator lens a reticle image for a desired point of impact of a bullet on a target, a related metadata overlay, along with a video image overlay, the target, the reticle image, the related metadata overlay, and the video image overlay all being directly visible to the user, when viewing the target through the optical collimator lens; a microprocessor that calculates a ballistic solution for the target and generates the reticle image for the desired point of impact of the bullet on the target based on the calculated ballistic solution, the microprocessor providing a signal containing the reticle image and the related metadata overlay to the display, the ballistic solution including a flight trajectory for the bullet for the desired point of impact on the target based on at least one of a type of weapon, a type of bullet, windage, velocity, energy, lead, or flight time and compensating for atmospheric conditions; a power system that provides power to the display and the microprocessor; and a rail grabber configured to couple the reflex sight to a barrel of a weapon.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer, or section from another region, layer, or section. Thus, a first element, component, region, layer, or section could be termed a second element, component, region, layer, or section without departing from the teachings of the present invention.

Spatially relative terms, such as "lower", "upper" and the like, may be used herein for ease of description to describe the relationship of one element or feature to another element(s) or feature(s) as illustrated in the FIGs. It will be understood that the spatially relative terms are intended to encompass different orientations of the device in use or operation, in addition to the orientation depicted in the FIGs. For example, if the device in the FIGs is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings, and the appended claims. In addition to variations and modifications in the component parts and/or arrangements, alternative uses will also be apparent to those skilled in the art.

What is claimed is:

1. A reflex sight, comprising:
   a housing;
   an optical collimator lens disposed within the housing and including a dichroic coating configured to reflect one or more wavelengths of light, wherein a target is viewable by a user through the optical collimator lens;
   a superluminescent micro-display that projects onto the optical collimator lens a reticle image for a desired point of impact of a bullet on a target and a related metadata overlay, wherein the reticle image and the related metadata overlay are superimposed on a view of the target viewable through the optical collimator lens, such that the target, the reticle image, and the related metadata overlay are all directly visible to the user, when viewing the target through the optical collimator lens;
   a microprocessor that calculates a ballistic solution for the target and generates the reticle image for the desired point of impact of the bullet on the target based on the calculated ballistic solution along with other useful metadata, the microprocessor providing a signal containing the reticle image and the related metadata overlay to the superluminescent micro-display;
   a power system that provides power to the superluminescent micro-display and the microprocessor;
   a rail grabber configured to couple the reflex sight to a barrel of a weapon; and
   a boresighting mechanism configured to align the reflex sight with the barrel, wherein the superluminescent micro-display comprises a superluminescent active matrix light emitting diode (SAMLED) array.

2. The reflex sight of claim 1, further comprising a user interface configured to receive an input from a user.

3. The reflex sight of claim 2, wherein the user interface includes at least one of a touch panel, one or more buttons, one or more knobs, one or more joysticks, and/or software menus.

4. The reflex sight of claim 3, wherein the microprocessor moves the reticle image vertically and laterally in response to input by a user via the user interface.

5. The reflex sight of claim 3, wherein the microprocessor controls a brightness of the superluminescent micro-display in response to input by a user via the user interface.

6. The reflex sight of claim 1, wherein the related metadata comprises at least one of an ammunition type, a distance to the target, or a battery status.

7. The reflex sight of claim 1, wherein the power system comprises at least one of a battery or a power cable connection.

8. The reflex sight of claim 1, further comprising a laser range finder configured to provide to the microprocessor distance to target data.

9. The reflex sight of claim 1, further comprising a video camera, wherein the superluminescent micro-display projects a video image of the target onto the optical collimator lens as a video image overlay.

10. The reflex sight of claim 1, further comprising at least one of a temperature sensor, a humidity sensor, a pressure sensor, an anemometer, an inclinometer, an accelerometer/gyro, or a global positioning system (GPS) sensor, wherein the microprocessor receives data from the at least one of the temperature sensor, the humidity sensor, the pressure sensor, the anemometer, the inclinometer, the accelerometer/gyro, or the global positioning system (GPS) sensor.

11. The reflex sight of claim 10, wherein the microprocessor calculates the ballistic solution for the target based on the data received from the at least one of the temperature sensor, the humidity sensor, the pressure sensor, the anemometer, the inclinometer, the accelerometer/gyro, or the global positioning system (GPS) sensor.

12. The reflex sight of claim 1, wherein the boresighting mechanism allows the reflex sight to be moved vertically and/or horizontally with respect to the barrel.

13. The reflex sight of claim 1, wherein the microprocessor comprises a memory configured to store data.

14. The reflex sight of claim 13, wherein the stored data includes ammunition tables and user settings.

15. The reflex sight of claim 1, further comprising a light sensor configured to sense ambient light, wherein the microprocessor controls a brightness of the superluminescent micro-display in response to the sensed ambient light.

16. The reflex sight of claim 1, further comprising a magnifier configured to magnify the target.

17. The reflex sight of claim 1, wherein the rail grabber comprises a Picatinny rail grabber.

18. The reflex sight of claim 1, wherein the ballistic solution comprises a flight trajectory for the bullet for the desired point of impact on the target based on at least one of a type of weapon, a type of bullet, windage, velocity, energy, lead, or flight time and compensating for atmospheric conditions.

19. The reflex sight of claim 18, wherein the atmospheric conditions include at least one of temperature, barometric pressure, humidity, or altitude.

20. A reflex sight, comprising:
a housing;
an optical collimator lens disposed within the housing and including a dichroic coating configured to reflect one or more wavelengths of light, wherein a target is viewable by a user through the optical collimator lens;
a superluminescent micro-display that projects onto the optical collimator lens a reticle image for a desired point of impact of a bullet on a target and a related metadata overlay, wherein the reticle image and the related metadata overlay are superimposed on a view of the target viewable by a user through the optical collimator lens, such that the target, the reticle image, and the related metadata overlay are all directly visible to the user, when viewing the target through the optical collimator lens, and wherein the superluminescent micro-display is brightness adjustable to allow viewing of the reticle image and the related metadata overlay at all levels of ambient light;
a microprocessor that calculates a ballistic solution for the target and generates the reticle image for the desired point of impact of the bullet on the target based on the calculated ballistic solution along with other metadata, the microprocessor providing a signal containing the reticle image and the related metadata overlay to the display;
a power system that provides power to the display and the microprocessor; and
a rail grabber configured to couple the reflex sight to a barrel of a weapon, wherein the superluminescent micro-display comprises a superluminescent active matrix light emitting diode (SAMLED) array.

21. A reflex sight, comprising:
a housing;
an optical collimator lens disposed within the housing and including a dichroic coating configured to reflect one or more wavelengths of light, wherein a target is viewable by a user through the optical collimator lens;
a video camera configured to capture a video image of the target;
a superluminescent micro-display that projects onto the optical collimator lens a reticle image for a desired point of impact of a bullet on a target, a related metadata overlay, along with a video image overlay, wherein the target, the reticle image, the related metadata overlay, and the video image overlay are all directly visible to the user, when viewing the target through the optical collimator lens;
a microprocessor that calculates a ballistic solution for the target and generates the reticle image for the desired point of impact of the bullet on the target based on the calculated ballistic solution along with other metadata, the microprocessor providing a signal containing the reticle image and the related metadata overlay to the display, wherein the ballistic solution comprises a flight trajectory for the bullet for the desired point of impact on the target based on at least one of a type of weapon, a type of bullet, windage, velocity, energy, lead, or flight time and compensating for atmospheric conditions;
a power system that provides power to the display and the microprocessor; and
a rail grabber configured to couple the reflex sight to a barrel of a weapon, wherein the superluminescent micro-display comprises a superluminescent active matrix light emitting diode (SAMLED) array.

* * * * *